United States Patent
Ma et al.

(10) Patent No.: US 11,360,619 B2
(45) Date of Patent: Jun. 14, 2022

(54) TOUCH PANEL, FABRICATION METHOD, REPAIR METHOD, AND TOUCH DEVICE

(71) Applicant: Shanghai Tianma Micro-Electronics Co., Ltd., Shanghai (CN)

(72) Inventors: Conghua Ma, Shanghai (CN); Qijun Yao, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 16/685,120

(22) Filed: Nov. 15, 2019

(65) Prior Publication Data
US 2020/0272278 A1    Aug. 27, 2020

(30) Foreign Application Priority Data
Feb. 27, 2019   (CN) .................... 201910144974.X

(51) Int. Cl.
*G06F 3/044*   (2006.01)

(52) U.S. Cl.
CPC .. *G06F 3/0443* (2019.05); *G06F 2203/04103* (2013.01); *G06F 2203/04111* (2013.01)

(58) Field of Classification Search
CPC .... G06F 3/0446; G06F 3/0443; G06F 3/0412; G06F 3/04164; G06F 3/041; G06F 3/044; G06F 3/0445; G06F 3/047; G06F 2203/04111; G06F 2203/04103; G06F 2203/04102; G06F 2203/04112; G06F 30/394
See application file for complete search history.

(56) References Cited

U.S. PATENT DOCUMENTS

| | | | | |
|---|---|---|---|---|
| 2010/0007615 A1* | 1/2010 | Wu | .................... | G06F 3/047 345/173 |
| 2012/0229395 A1* | 9/2012 | Shin | .................... | G06F 3/0446 345/173 |
| 2014/0110236 A1* | 4/2014 | Lee | .................... | G06F 3/0445 200/5 A |
| 2016/0170524 A1* | 6/2016 | Kim | .................... | G06F 3/0443 345/174 |

FOREIGN PATENT DOCUMENTS

| | | |
|---|---|---|
| CN | 101216644 A | 7/2008 |
| CN | 101984391 A | 3/2011 |
| CN | 103092414 A | 5/2013 |

* cited by examiner

*Primary Examiner* — Dong Hui Liang
(74) *Attorney, Agent, or Firm* — Anova Law Group, PLLC

(57) ABSTRACT

A touch panel, a fabricating method, a repair method, and a touch device are provided. The touch panel includes a substrate, and a touch electrode layer, the repair lines, and repair conductive portions, on the substrate. The touch electrode layer includes a touch electrode array. The repair lines are outside the touch electrode array. In a direction perpendicular to the touch panel, at least part of touch electrodes at edges of the touch electrode array overlaps the repair conductive portions, and/or the repair conductive portions overlap at least part of repair lines.

11 Claims, 10 Drawing Sheets

TOUCH PANEL, FABRICATION METHOD, REPAIR METHOD, AND TOUCH DEVICE

CROSS-REFERENCE TO RELATED APPLICATIONS

This application claims priority of Chinese Patent Application No. 201910144974.X, filed on Feb. 27, 2019, the entire contents of which are hereby incorporated by reference.

FIELD OF THE DISCLOSURE

The present disclosure generally relates to the field of display technologies, and, more particularly, relates to a touch panel, a fabricating method, a repair method, and a touch device.

BACKGROUND

With the development of technology, smart devices such as mobile phones, tablet PCs, digital cameras, and smart wearable products with touch functions simplify human-computer interaction and bring users a high-quality user experience. According to the differences in detection methods, a touch panel is roughly classified into a resistive touch panel, a capacitive touch panel, an optical touch panel, an acoustic wave touch panel, an electromagnetic touch panel and the like. Capacitive touch panels are widely used in electronic products because of their fast response time, good reliability and high durability.

A conventional capacitive touch panel usually includes a touch electrode array. The touch electrode array includes a plurality of first touch electrodes disposed in a row direction and a plurality of second touch electrodes disposed in a column direction. Two first touch electrodes adjacent in the row direction or two second touch electrodes adjacent in the column direction are respectively connected by a bridging line.

There is still a need to provide a touch panel, its fabricating method and repair method, and a touch device, with improved product yield.

BRIEF SUMMARY OF THE DISCLOSURE

One aspect of the present disclosure provides a touch panel. The touch panel includes a substrate, and a touch electrode layer, repair lines, and repair conductive portions on the substrate. The touch electrode layer includes a touch electrode array, and the repair lines are outside the touch electrode array. In a direction perpendicular to the touch panel, at least part of touch electrodes at edges of the touch electrode array overlap the repair conductive portions, and/or the repair conductive portions overlap at least part of the repair lines.

Another aspect of the present disclosure provides a fabricating method of a touch panel. The method includes forming a touch electrode layer, the repair lines, and repair conductive portions on the substrate. The touch electrode layer includes a touch electrode array. The repair lines are outside the touch electrode array. In a direction perpendicular to the touch panel, at least part of touch electrodes at edges of the touch electrode array overlap the repair conductive portions, and/or the repair conductive portions overlap at least part of repair lines. The formation process of the touch electrode layer includes: forming a touch electrode film layer on the substrate; coating a photoresist over the touch electrode film layer and curing the coated photoresist; exposing the cured photoresist, and removing a portion of the photoresist to expose the touch electrode film layer; and etching the touch electrode film layer to form the touch electrode array.

Another aspect of the present disclosure provides a repair method of a touch panel. The method includes providing a touch panel including a substrate; and a touch electrode layer, repair lines, and repair conductive portions, on the substrate. The touch electrode layer includes a touch electrode array, and the repair lines are outside the touch electrode array; in a direction perpendicular to the touch panel, at least part of touch electrodes at edges of the touch electrode array overlap the repair conductive portions, and/or the repair conductive portions overlap at least part of repair lines. When the touch panel is detected to have a portion to be repaired, the repair method at least includes electrically connecting the repair conductive portions with an overlapped portion between the repair conductive portions and the at least part of repair lines.

Other aspects or embodiments of the present disclosure can be understood by those skilled in the art in light of the description, the claims, and the drawings of the present disclosure.

BRIEF DESCRIPTION OF THE DRAWINGS

The drawings that are incorporated in the specification and form part of the specification to illustrate various embodiments and their principles in the present disclosure.

DETAILED DESCRIPTION

Figure 1:
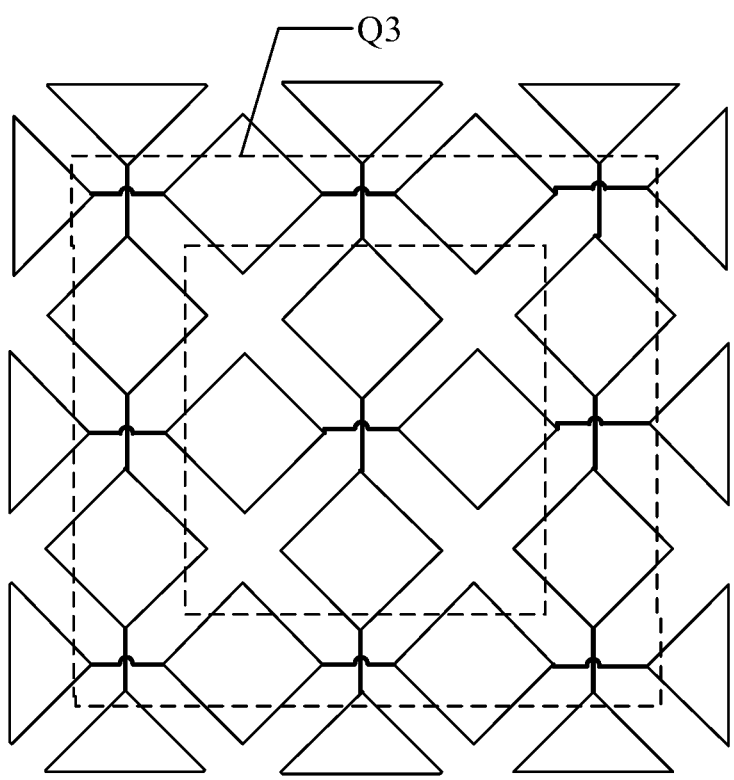
FIG. 1 illustrates a schematic diagram of a patterned touch electrode array.

Exemplary embodiments of the disclosure will now be described in detail with reference to the accompanying drawings. It should be noted that, unless otherwise specified, the relative arrangement, numerical expressions and numerical values of components and steps set forth in one embodiment are not intended to limit the scope of the disclosure.

The following description of the at least one exemplary embodiment is merely illustrative and is in no way intended as a limitation of the disclosure and its application or use.

Techniques, methods and apparatus known to those skilled in the relevant art may not be discussed in detail. However, where appropriate, techniques, methods and apparatus should be considered as part of the specification.

In all examples shown and discussed herein, any specific values should be construed as illustrative only and not as a limitation. Other examples of the exemplary embodiments may have different values.

It should be noted that similar reference numerals and letters indicate similar items in the following drawings. Once an item is defined in one drawing, it is not required to be further discussed in subsequent drawings.

In a touch panel, a touch electrode array includes a plurality of first touch electrodes disposed in a row direction and a plurality of second touch electrodes disposed in a column direction. Two first touch electrodes adjacent in the row direction or two second touch electrodes adjacent in the column direction are respectively connected by a bridging line. In fabricating the touch panel having the touch electrode array described above, touch detection failure areas in the touch electrode array may be detected. FIG. 1 illustrates a schematic diagram of a patterned touch electrode array. As shown in FIG. 1, it is detected that the plurality of bridging lines at an edge position Q3 of the touch electrode array often have disconnection problems, resulting in reduced the touch panel yield.

Figure 2:
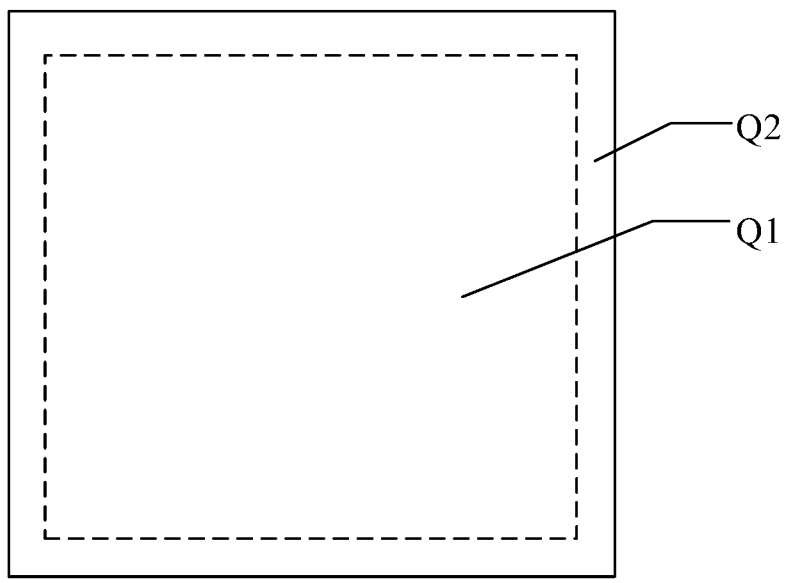
FIG. 2 illustrates a schematic diagram of photoresist curing.

When touch functions are integrated into an organic light-emitting display panel, light-emitting devices may be first formed, the encapsulation layer is formed to package light-emitting devices, and the plurality of touch electrodes are formed on the encapsulation layer. Touch electrodes are usually formed by an etching process. Exemplary steps including spin coating photoresist, and photoresist curing and exposure are included in the formation process. In the photoresist curing process, heating is used to cure the photoresist. If the temperature of the photoresist curing process is too high, it may degrade the luminescence performance of luminescent devices. Accordingly, the curing temperature in the process is limited. When the photoresist is cured at a temperature that does not degrade light-emitting devices, the edge position of the photoresist may not be completely cured. FIG. 2 illustrates a schematic diagram of photoresist curing. The central region Q1 of the photoresist is cured completely. There is a circle of the edge region Q2 that is not fully cured at the edge of the photoresist. The thickness of the photoresist at the edge Q2 is thinner than the thickness of photoresist at in the central region Q1. In the process of developing and dissolving the photoresist after exposing the photoresist, since the thickness of the photoresist at the edge region Q2 is thin, the photoresist at the edge region Q2 is dissolved earlier than that at the region Q1 and the film layer to be patterned under the photoresist is exposed. The film layer to be patterned corresponding to the edge region Q2 is also affected by the developer to cause the thin thickness of the photoresist at the edge region Q2. In the subsequent patterning process, in etching the film layer to be patterned at the location corresponding to the edge region Q2, under a same process conditions, the etching degree of the film layer corresponding to the edge region Q2 is greater than that of the film layer corresponding to the central region Q1, so that the conductive wires are thinner and the risk of disconnection is greater. When the above process is used to form touch electrodes, as shown in FIG. 1, in forming the touch electrode array having a plurality of bridging lines at an edge position Q3 of the touch electrode array, the above process limitation may cause the plurality of bridging lines at the edge Q3 to be thinner, resulting in the risk of disconnection and affecting the product yield.

When a plurality of bridging lines at edges of the touch electrode array are detected to be broken and affect the touch performance in the fabrication process, a touch panel provided by the disclosure can repair the touch panel to improve the product yield.

Figure 3:
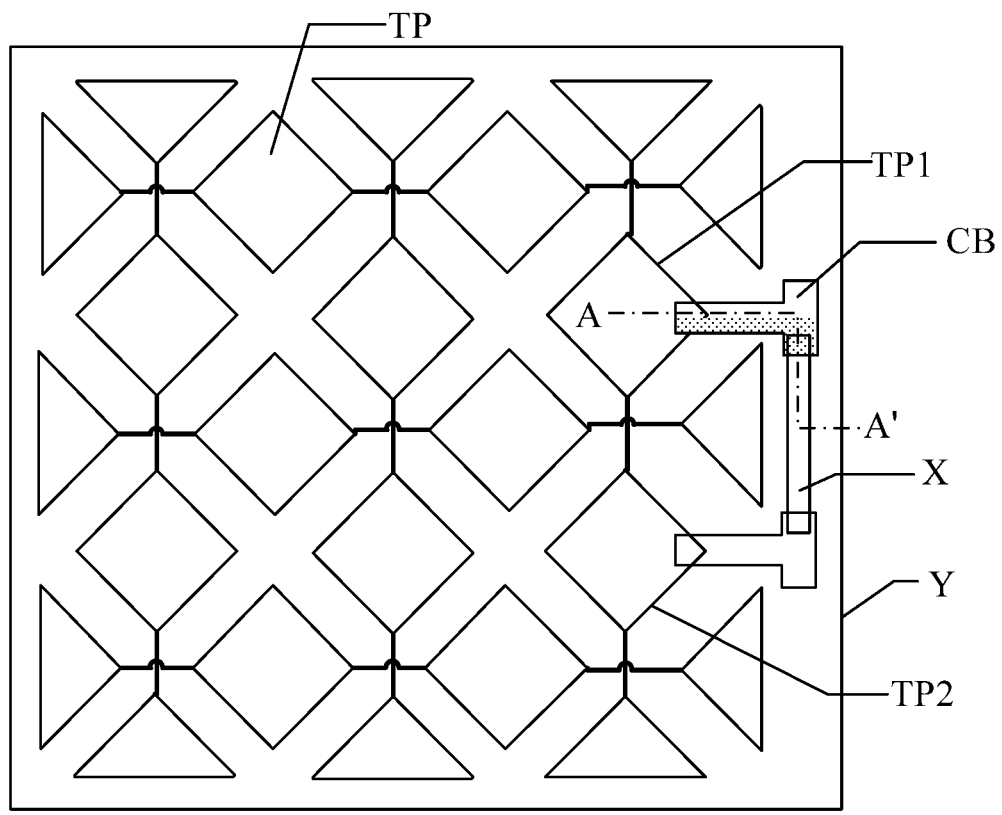
FIG. 3 illustrates a top view of an exemplary touch panel consistent with various disclosed embodiments of the present disclosure.

FIG. 3 illustrates a top view of an exemplary touch panel consistent with various disclosed embodiments of the present disclosure. The touch panel includes a substrate 101, a touch electrode layer, repair lines X and repair conductive portions CB on the substrate 101. The touch electrode layer includes a touch electrode array. The repair lines X are outside the touch electrode array. That is, the repair lines X are on the side of the touch electrode array near the edge Y of the touch panel. The repair lines X may be around the touch electrode array or may be only in part of areas outside the touch electrode array. The touch electrode array includes a plurality of touch electrodes TP disposed in an array. FIG. 3 only illustrates part of repair lines X and repair conductive portions CB. For illustration purposes, FIG. 3 only illustrates the positional relationship between the repair lines X, the repair conductive portions CB, and touch electrodes TP when viewed from a top view. The relationship between the repair lines X, the repair conductive portions CB and touch electrodes TP is explained as follows. In a direction perpendicular to the touch panel, at least part of touch electrodes TP at edges of the touch electrode array overlap the repair conductive portions CB, and/or the repair conductive portions CB overlap at least part of the repair lines X. The repair conductive portions CB and either touch electrodes TP or the repair lines X are separated by an insulation layer (The insulation layer may be a layer or a plurality of layers, which is not limited herein, and is actually formed according to specific design requirements). The positional relationship of the repair conductive portions, touch electrodes and the repair lines on the film layer includes at least the following cases.

Figure 4:
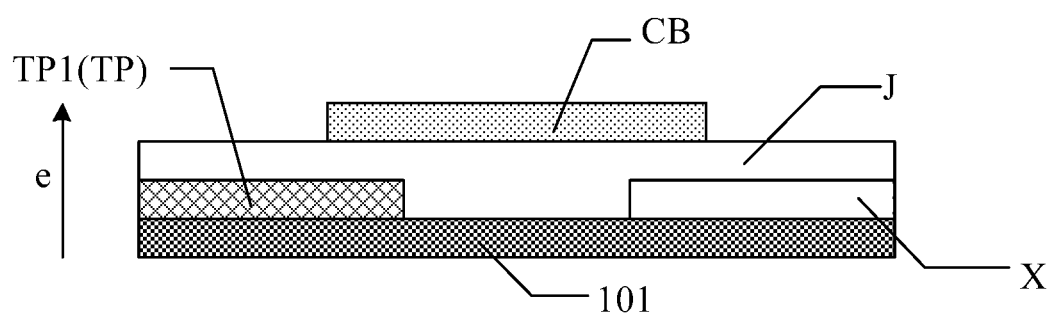
FIG. 4 illustrates an A-A' sectional view of the exemplary touch panel in FIG. 3 consistent with various disclosed embodiments of the present disclosure.

In the first case, the repair conductive portions and touch electrodes are separated by the at least one insulation layer. At least part of repair conductive portions overlaps touch electrodes at edges of the touch electrode array. The repair conductive portions and the repair lines are separated by the at least one insulation layer. At least part of repair conductive portions overlaps the repair lines. Touch electrodes and the repair lines may be on a same film layer or on different film layers. FIG. 4 illustrates an A-A' sectional view of the exemplary touch panel in FIG. 3 consistent with various disclosed embodiments of the present disclosure. Taking touch electrodes TP and the repair lines X on the same film layer as an example, the repair conductive portions CB are spaced apart from touch electrodes TP and the repair lines X by the insulation layer J. Direction e is the direction perpendicular to the touch panel. Repaired conductive portions CB partially overlap both touch electrodes TP and the repair lines X. When a plurality of bridging lines between a plurality of touch electrodes TP1 and a plurality of touch electrodes TP2 are detected to be broken in the fabrication process, the portion where the repair conductive portions CB overlap touch electrodes TP can be connected by a fusion bonding process. The repair conductive portions CB are connected to the overlapped part of the repair lines X. The fusion bonding process can melt the insulation layer between the repair conductive portions CB and touch electrodes TP to realize the electrical connection between the repair conductive portions CB and touch electrodes TP, or the fusion bonding process can melt the overlapped repair conductive portions CB and repair lines X, so that the repair conductive portions CB are electrically connected to the repair lines X, thereby realizing the connections between the plurality of touch electrode TP1 and the plurality of touch electrode TP2.

Figure 5:
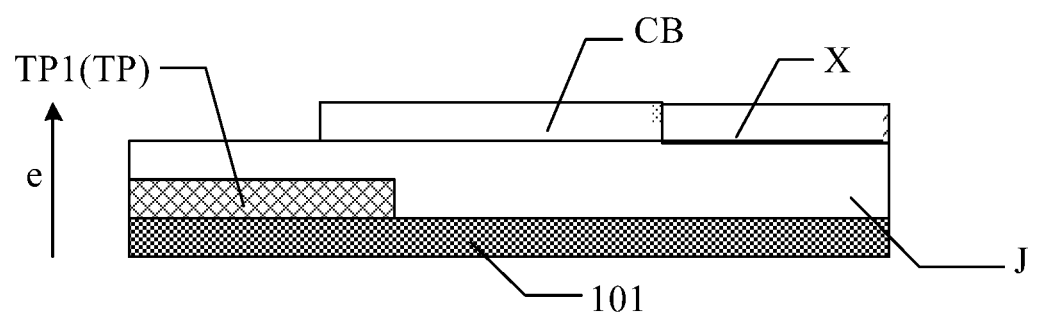
FIG. 5 illustrates another A-A' sectional view of the exemplary touch panel in FIG. 3 consistent with various disclosed embodiments in the present disclosure.

In the second case, the repair conductive portions and touch electrodes are separated by the at least one insulation layer. At least part of repair conductive portions overlaps touch electrodes at edges of the touch electrode array. There is no insulation interval between the repair conductive portions and the repair lines. That is, repair conductive portions and the repair lines are on a same layer and electrically connected. FIG. 5 illustrates another A-A' sectional view of the exemplary touch panel in FIG. 3 consistent with various disclosed embodiments in the present disclosure. The repair conductive portions CB and the repair lines X are on the same layer. The repair conductive portions CB are in contact with the repair lines X. At least part of repair conductive portions CB overlap touch electrodes TP. When the plurality of bridging lines between the plurality of touch electrode TP1 and the plurality of touch electrode TP2 are detected to be broken in the fabrication process, the portion where the repair conductive portions CB overlap the touch electrodes TP may be connected by a fusion bonding process, thereby realizing the connections between the plurality of touch electrode TP1 and the plurality of touch electrode TP2.

Figure 6:
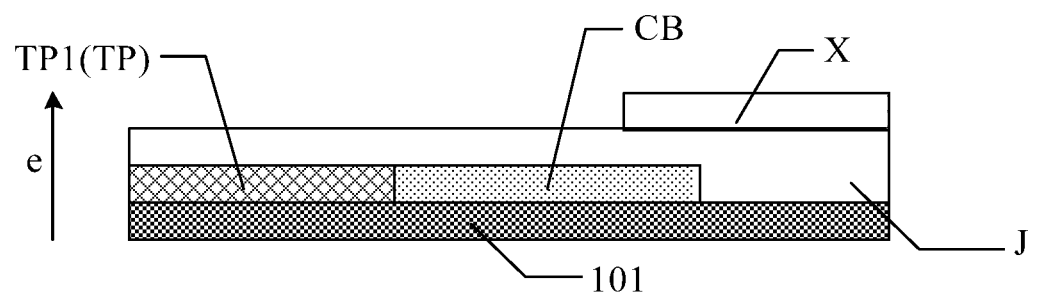
FIG. 6 illustrates yet another A-A' sectional view of the exemplary touch panel in FIG. 3 consistent with various disclosed embodiments in the present disclosure.

In the third case, the repair conductive portions and the repair lines are separated by the at least one insulation layer. At least part of repair conductive portions overlap the repair lines. There is no insulation interval between the repair conductive portions and touch electrodes. That is, the repair conductive portions and touch electrodes are on a same layer, and the repair conductive portions are electrically connected to touch electrodes. FIG. 6 illustrates yet another A-A' sectional view of the exemplary touch panel in FIG. 3 consistent with various disclosed embodiments in the present disclosure. The repair conductive portions CB and touch electrodes TP are on the same layer s. The repair conductive portions CB are in contact with touch electrodes TP, and at least partially overlap the repair lines X. In the fabrication process, when the plurality of bridging lines between the plurality of touch electrode TP1 and the plurality of touch electrode TP2 is detected to be broken in the fabrication process, the portion where the repair conductive portions CB overlap the repair lines X can be connected by a fusion bonding process, thereby realizing the connections between the plurality of touch electrodes TP1 and the plurality of touch electrodes TP2.

When no disconnection problem is detected in the touch electrode array in the fabrication process, the touch panel is not required to be repaired. In the finished touch panel, when touch electrodes overlap the repair conductive portions, touch electrodes and the repair conductive portions are insulated and overlapped. When the repair conductive portions overlap the repair lines, the repair conductive portions and the repair lines are also insulated and overlapped. In the fabrication process, when disconnection problems are detected in the touch electrode array, the touch panel needs to be repaired. In a finished touch panel, when there are overlaps between touch electrodes and the repair conductive portions in repair areas, touch electrodes and the repair conductive portions are overlapped and connected to each other. When there are overlaps between the repair conductive portions and the repair lines in repair areas, the repair conductive portions and the repair lines are overlapped and connected to each other.

On the touch panel provided by the disclosure, the repair conductive portions, the repair lines and touch electrodes at a local position for repairing the touch electrode array at the local position cannot be on a same film layer. In order to realize that the repair conductive portions and the repair lines can repair the touch electrode array, before the fusion process, it is necessary to ensure a certain distance between touch electrodes and the repair conductive portions, or between the repair lines and repair conductive portion in design. When the repair conductive portions, the repair lines and touch electrodes are on the same film layer, it is necessary to ensure a distance close enough between any two of the three to ensure that the fusion boding process can make the two connect to each other. In view of current etching process limitation, the distance between any two of the three should be at least 3-4 micrometers, which is hard to ensure that the two are connected to each other during the fusion bonding process. When the distance between touch electrodes and the repair conductive portions, and or the distance between the repair conductive portions and the repair lines are designed to be small enough, it may cause misconnections between the repair conductive portions, the repair lines and touch electrodes, which affect the reliability of touch performance. In the present disclosure, the at least one of the repair conductive portions, the repair lines, and touch electrodes are disposed on different film layers from the other two, so that touch electrodes and the repair conductive portions, and/or the repair conductive portions and the repair lines are separated by an insulation layer. As the formation process of the insulation layer is mature, the thickness of the insulation layer can be made at the nanometer level, the interval between touch electrodes and the repair conductive portions, and/or the interval between the repair conductive portions and the repair lines can be made small. The fusion bonding process can make reliable connections between touch electrodes and the repair conductive portions and/or between the repair portion and the repair lines, thereby ensuring the reliability of repairing the touch panel.

The touch panel provided by the present disclosure has the repair lines and the repair conductive portions. The repair lines are outside the touch electrode array. In a direction perpendicular to the touch panel, at least part of touch electrodes at edges of the touch electrode array overlap the repair conductive portions, and/or the repair conductive portions overlap at least part of the repair lines. When a plurality of bridging lines are detected to be broken at edges of the touch electrode array, the overlapped touch electrodes and repair conductive portions and/or the overlapped repair lines and repair conductive portions can be connected by a fusion process, so that the connection between the two touch electrodes connected by a bridging line is realized by a repair conductive portion and a repair line, thereby realizing the repair of the touch electrode array, ensuring the reliability of touch performance of the touch panel, and improving the product yield.

In repairing the touch panel provided by the present disclosure by a fusion bonding process, only local sites instead of the whole touch panel need to be heated and fusion bonded. The fusion process has no effect on light-emitting devices on the touch panel. An actual touch panel product includes a display area and a non-display area. The display area has touch functions. The formed touch electrode array expands to the display area. That is, part of touch electrodes at edges of the touch electrode array are in the non-display area. In the present disclosure, the repair lines are outside the touch electrode array. That is, the repair lines are in the non-display area. In a direction perpendicular to the touch panel, the lower position corresponding to the repair lines has no light-emitting devices. When performed on the region where the repair conductive portions overlap the repair lines, the fusion bonding process has no effect on light-emitting devices and does not need to consider the limitation of the process temperature. The material for the repair lines and the repair conductive portions may also be any metal material.

Figure 7:
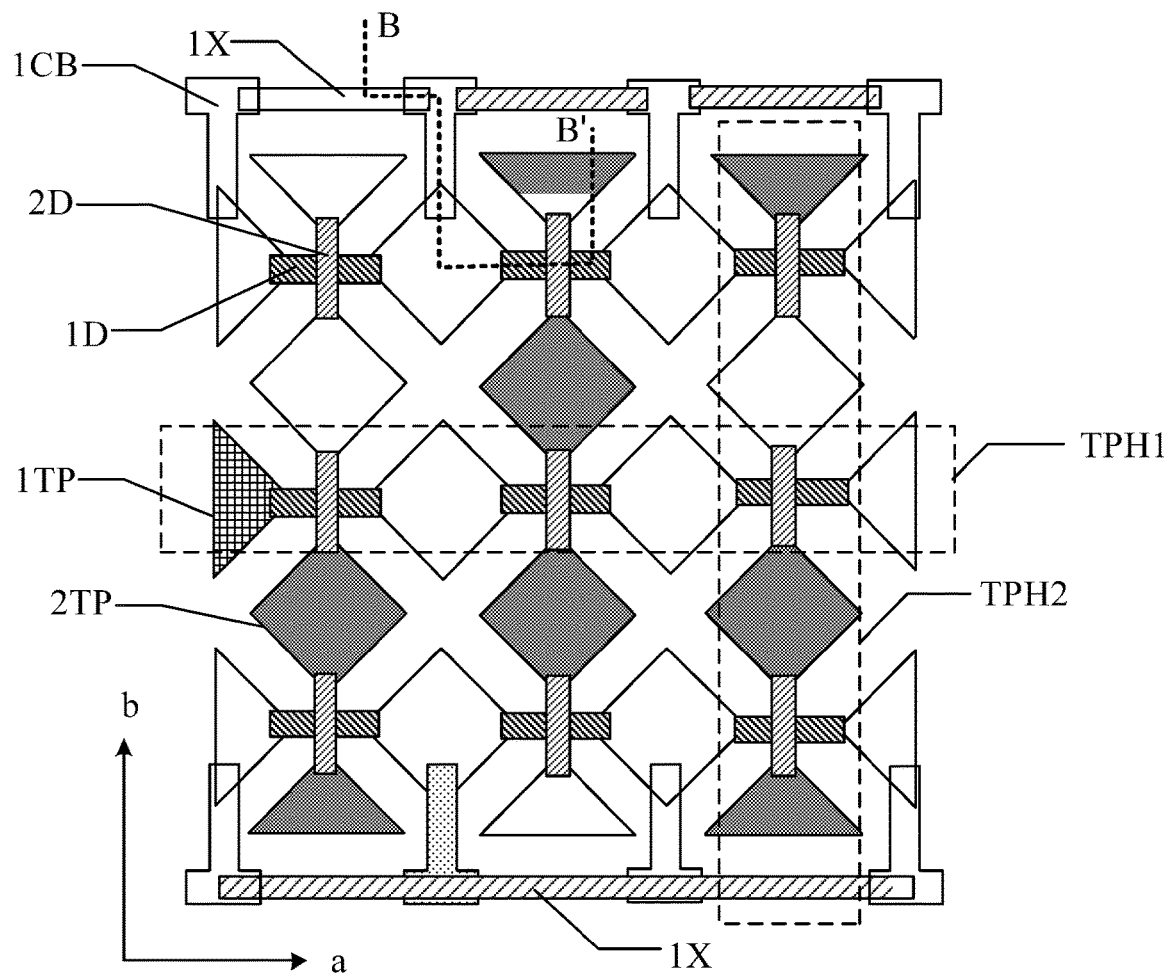
FIG. 7 illustrates a schematic diagram of another exemplary touch panel consistent with various disclosed embodiments of the present disclosure.

In one embodiment, FIG. 7 illustrates a schematic diagram of another exemplary touch panel consistent with various disclosed embodiments of the present disclosure. As shown in FIG. 7, a touch electrode array includes a first touch unit TPH1 extending along a first direction a and a second touch unit TPH2 extending along a second direction b. A plurality of first touch units TPH1 are disposed in sequence in the second direction b. A plurality of second touch units TPH2 are disposed in sequence in the first direction a. The first touch unit TPH1 includes a plurality of first touch electrodes 1TP and a plurality of first bridge lines 1D. The first bridging line 1D electrically connects the adjacent two first touch electrodes 1TP. The second touch unit TPH2 includes a plurality of second touch electrodes 2TP and a plurality of second bridging lines 2D. The second bridging line 2D electrically connects the adjacent two second touch electrodes 2TP. The plurality of first bridging lines 1D cross and are insulated from second bridging lines 2D. The repair lines X include first repair lines 1X. Optionally, the first repair lines 1X extend along the first direction a. The repair conductive portions CB include first repair conductive portions 1CB. FIG. 7 illustrates the positional relationship between the plurality of first touch electrodes 1TP, the first repair lines 1X, and the first repair conductive portions 1CB only when viewed in a top view. In a direction perpendicular to the touch panel, the plurality of first touch electrodes 1TP in the first and last first touch units TPH1 overlap first repair conductive portions 1CB, and/or, first repair conductive portions 1CB partially overlap the first repair lines 1X in the second direction b. For the positions of first touch electrodes 1TP, first repair lines 1X and first repair conductive portions 1CB on the film layer, reference may be made to FIGS. 4-6 described above. The plurality of first touch electrodes 1TP refer to the film layer position of touch electrodes TP. The first repair conductive portions 1CB refer to the film position of the repair conductive portions CB. The first repair lines 1X refer to the film position of the repair lines X.

With the first repair lines and the first repair conductive portions disposed on the touch panel, when the plurality of first bridging lines in the first or last first touch unit in the second direction are detected to be broken, the plurality of first touch electrodes overlap and electrically connect the first repair conductive portions, and/or the first repair conductive portions overlaps and electrically connect the first repair lines by a fusion bonding process (for example, the fusion location is selected according to the positional relationship between the plurality of first touch electrode, the first repair conductive portions, and the first repair lines). The two disconnected first touch electrodes are reconnected by a first repair conductive portion and a first repair lines, thereby realizing the repair of the touch electrode array, ensuring the touch performance of the touch panel, and improving the product yield. In addition, when the repair is performed by a fusion bonding process, only the local sites instead of the entire touch panel need to be heated and fusion bonded. The fusion bonding process has no effect on light-emitting devices on the touch panel. In a touch panel in which the touch electrode array can be repaired only by fusion bonding the overlapped first repair conductive portions and first repair lines, repair sites are in the non-display area, and light-emitting devices are not disposed at positions where the fusion-bonding sites are located. The fusion bonding process does not need to consider the limitation of the process temperature. The material for the repair lines and the repair conductive portions may also be any metal material.

The above FIG. 7 illustrates a condition where the first repair lines 1X are at a position adjacent to both the first first-touch unit TPH1 and the last first-touch unit TPH1 in the second direction b. In some optional embodiments, the first repair lines 1X may also be disposed only at positions adjacent to the first or last first touch unit TPH1.

FIG. 7 illustrates a condition where a plurality of first repair lines 1X are disposed on one side of the upper edge of the touch electrode array. The plurality of first repair lines 1X are on one side of the lower edge of the touch electrode array. The plurality of first repair lines 1X overlap a plurality of first repair conductive portions 1CB simultaneously. FIG. 7 illustrates two setting modes of the repair lines. Any one of the above two setting modes may be adopted in one touch panel, or the above two setting modes may be simultaneously adopted in one touch panel.

In one embodiment, the first touch electrode and the second touch electrode are on a same film layer, which helps reduce the thickness of the touch panel film layer. The plurality of first touch electrodes and the plurality of second touch electrodes are formed by a same etching process.

Figure 8:
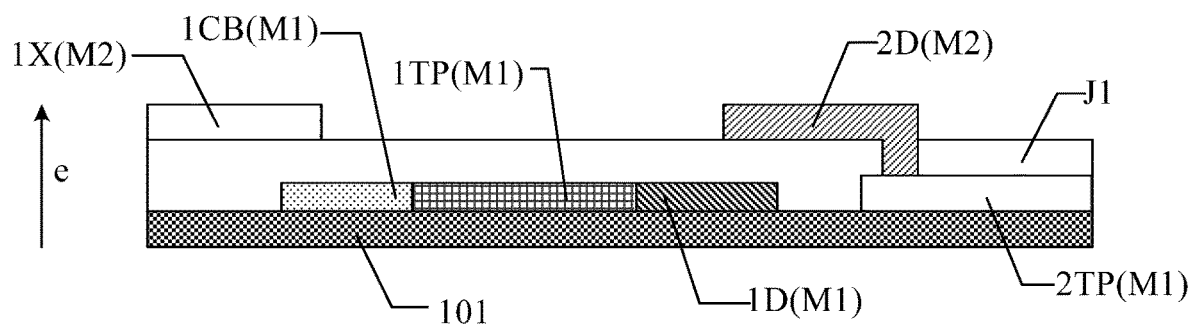
FIG. 8 illustrates a B-B' sectional view of the exemplary touch panel in FIG. 7 consistent with various disclosed embodiments of the present disclosure.

FIG. 8 illustrates a B-B' sectional view of the exemplary touch panel in FIG. 7 consistent with various disclosed embodiments of the present disclosure. The touch panel includes a first conductive layer M1, a first insulation layer J1, and a second conductive layer M2 disposed in sequence. The plurality of first touch electrodes 1TP and the plurality of second touch electrodes 2TP are on the first conductive layer M1. The plurality of first bridging lines 1D are on the first conductive layer M1. In the formation process, the plurality of first bridging lines 1D and the plurality of first touch electrodes 1TP are formed in a same etching process. The plurality of first bridging lines 1D are in direct contact with the plurality of first touch electrodes 1TP. The plurality of second bridging lines 2D are on the second conductive layer M2. The plurality of second bridging lines and the plurality of second touch electrodes 2TP are separated by the first insulation layer J1. The plurality of second bridging lines 2D are connected to second touch electrode 2TP by through holes on the first insulation layer J1. When first repair conductive portions 1CB are on the first conductive layer M1, first repair conductive portions 1CB are in direct contact with the first touch electrode 1TP, and the first repair lines 1X are on the second conductive layer M2. In a direction e perpendicular to the touch panel, first repair conductive portions 1CB partially overlap the first repair lines 1X. When first bridge lines in the first first-touch unit or the last first-touch unit are broken in the second direction, the touch panel can repair the touch electrode array and improve the touch panel product yield. First repair conductive portions are disposed on the first conductive layer, and the first repair lines are disposed on the second conductive layer. The design of first repair conductive portions and the first repair lines does not increase film structures of the touch panel, which helps reduce the thickness of the touch panel. The first repair conductive portions and the plurality of touch electrodes can be formed in a same formation process. The first repair lines and the plurality of first bridging lines or second bridging lines can be formed in the same formation process. The formation process is reused without adding new formation processes, therefore the formation process is relatively simple. In repairing the touch electrode array, only areas where the first repair lines overlap the first repair conductive portions are used as fusion sites. Fusion sites are in the non-display area, and the fusion process has no effect on the degradation of light-emitting devices.

FIG. 8 illustrates the first conductive layer, the first insulation layer and the second conductive layer disposed in sequence on the substrate. Optionally, in one embodiment, the second conductive layer, the first insulation layer, and the first conductive layer may be disposed in sequence on the substrate. The plurality of touch electrodes, the first repair conductive portions and the first repair lines in the film structure are respectively located on the same film lays as those in FIG. 8.

Figure 9:
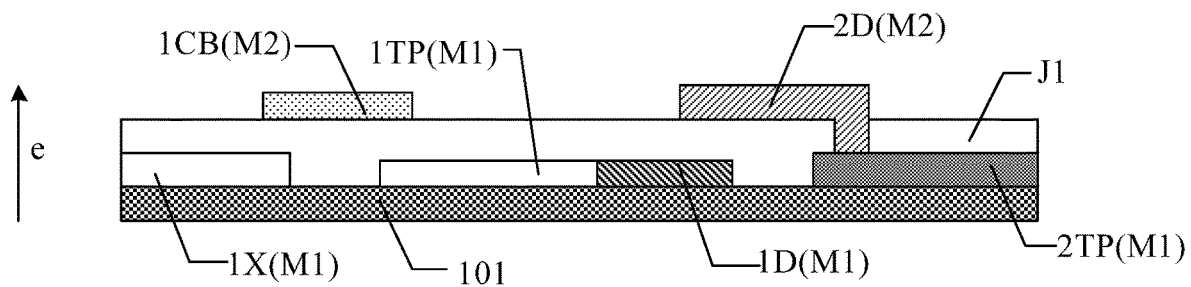
FIG. 9 illustrates another B-B' sectional view of the exemplary touch panel in FIG. 7 consistent with various disclosed embodiments of the present disclosure.

FIG. 9 illustrates another B-B' sectional view of the exemplary touch panel in FIG. 7 consistent with various disclosed embodiments of the present disclosure. The touch panel includes a first conductive layer M1, a first insulation layer J1, and a second conductive layer M2 disposed in sequence. The plurality of first touch electrodes and the plurality of second touch electrodes are on the first conductive layer M1. The plurality of first bridging lines 1D are on the first conductive layer M1. In the formation process, the plurality of first bridging lines 1D and the plurality of first touch electrodes 1TP are formed in a same etching process. The plurality of first bridging lines 1D are in direct contact with the plurality of first touch electrodes 1TP. The plurality of second bridging lines 2D are on the second conductive layer M2. The plurality of second bridging lines and the plurality of second touch electrodes 2TP are separated by a first insulation layer J1. The plurality of second bridging lines 2D are connected to the plurality of second touch electrodes 2TP by through holes on the first insulation layer J1. First repair conductive portions 1CB are on the second conductive layer M2. That is, in a direction e perpendicular to the touch panel, the overlapped first repair conductive portions 1CB and second conductive layer M2 are separated by a first insulation layer J1. The first repair lines 1X are on the first conductive layer M1. The first repair layer 1X and first repair conductive portions 1CB are separated by the first insulation layer J1. The touch panel can repair the touch electrode array and improve the touch panel product yield. First repair conductive portions are on the second conductive layer. The first repair lines are on the first conductive layer. The design of first repair conductive portions and the first repair lines does not increase film structures of the touch panel, which helps reduce the thickness of the touch panel. The first repair conductive portions and the plurality of touch electrodes can be formed in a same formation process. The first repair lines and the plurality of first bridging lines or the plurality of second bridging lines can be formed in the same formation process. The formation process is reused without adding new formation processes, therefore the process is relatively simple. In repairing the touch electrode array, only areas where the first repair lines overlap the first repair conductive portions are used as fusion sites. The fusion sites are in the non-display area, and the fusion process has no effect on the degradation of light-emitting devices.

FIG. 9 illustrates the first conductive layer, the first insulation layer and the second conductive layer disposed in sequence on the substrate. Optionally, in one embodiment, the second conductive layer, the first insulation layer, and the first conductive layer may be disposed in sequence on the substrate. A plurality of touch electrodes, first repair conductive portions and the first repair lines in film structures are respectively located on the same film lays as those in FIG. 9.

Figure 10:
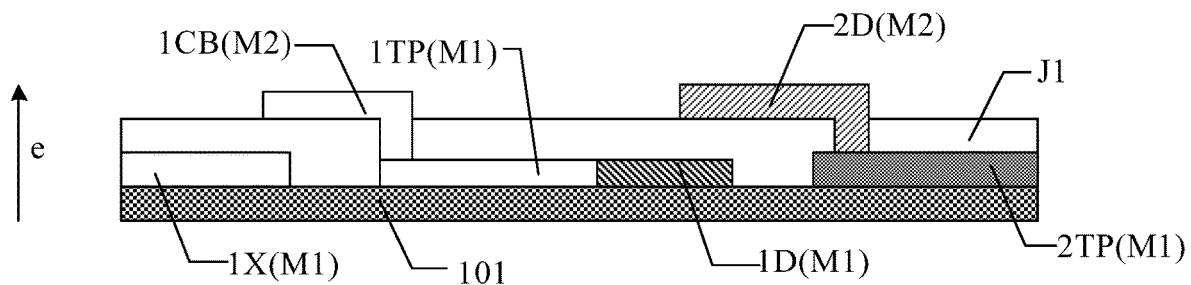
FIG. 10 illustrates yet another B-B' sectional view of the exemplary touch panel in FIG. 7 consistent with various disclosed embodiments of the present disclosure.

FIG. 10 illustrates yet another B-B' sectional view of the exemplary touch panel in FIG. 7 consistent with various disclosed embodiments of the present disclosure. First repair conductive portions 1CB overlap the plurality of first touch electrodes 1TP and are connected to the plurality of first touch electrodes 1TP by through holes on the first insulation layer J1. First repair conductive portions and the plurality of second bridging lines are on a same film layer (in another embodiment, first repair conductive portions and the plurality of first bridging lines may also be on a same film layer). The plurality of second bridging lines and the plurality of second touch electrodes are on different film layers. In fabricating a touch panel, a process for punching holes on insulation layers is required to connect the plurality of second bridging lines to the plurality of second touch electrodes. In the process of punching holes on the insulation layers, through holes connecting first repair conductive portions and the plurality of first touch electrodes can be simultaneously formed, and the process is relatively simple. In repairing the touch electrode array, only areas where the first repair lines overlap the first repair conductive portions are used as fusion sites. Fusion sites are in the non-display area, and the fusion process has no effect on the degradation of the light-emitting device.

In the above FIG. 8 and FIG. 9, the plurality of first bridging lines 1D are in the first conductive layer M1. The plurality of second bridging lines 2D are on the second conductive layer M2. In one embodiment, the plurality of first bridging lines 1D are on the second conductive layer M2. The plurality of first bridging lines 1D are connected to the plurality of first touch electrodes 1TP by through holes on the first insulation layer J1. The plurality of second bridging lines 2D are on the first conductive layer M1. The plurality of second bridging lines 2D are in direct contact with the plurality of second touch electrodes 2TP. The plurality of second bridging lines 2D and the plurality of second touch electrodes 2TP are formed on a same layer.

Figure 11:
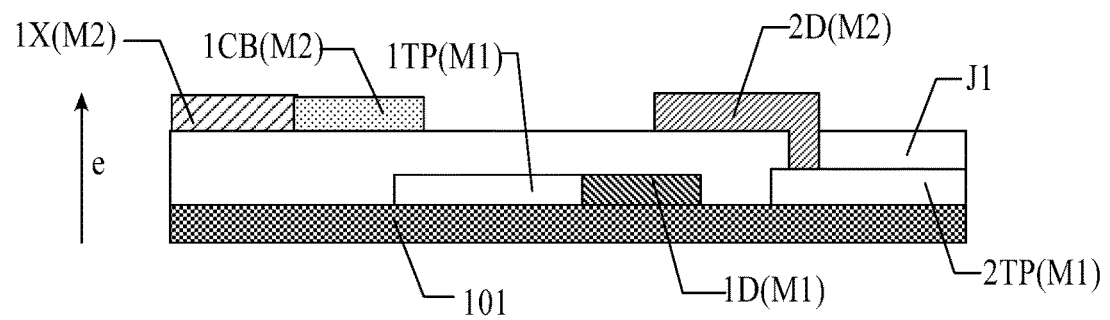
FIG. 11 illustrates still another B-B' sectional view of the exemplary touch panel in FIG. 7 consistent with various disclosed embodiments of the present disclosure.

FIG. 11 illustrates still another B-B' sectional view of the exemplary touch panel in FIG. 7 consistent with various disclosed embodiments of the present disclosure. The first repair lines 1X and the first repair conductive portions 1CB are on a same layer and are in contact with each other. The first repair lines 1X and the first repair conductive portions 1CB and a type of bridge line are on the same layer (FIG. 11 only illustrates the second bridge line 2D) and are made of a same material. That is, in fabricating the touch panel, the first repair lines 1X, the first repair conductive portions 1CB, and the plurality of second bridging lines 2D are completed in a same formation process.

Figure 12:
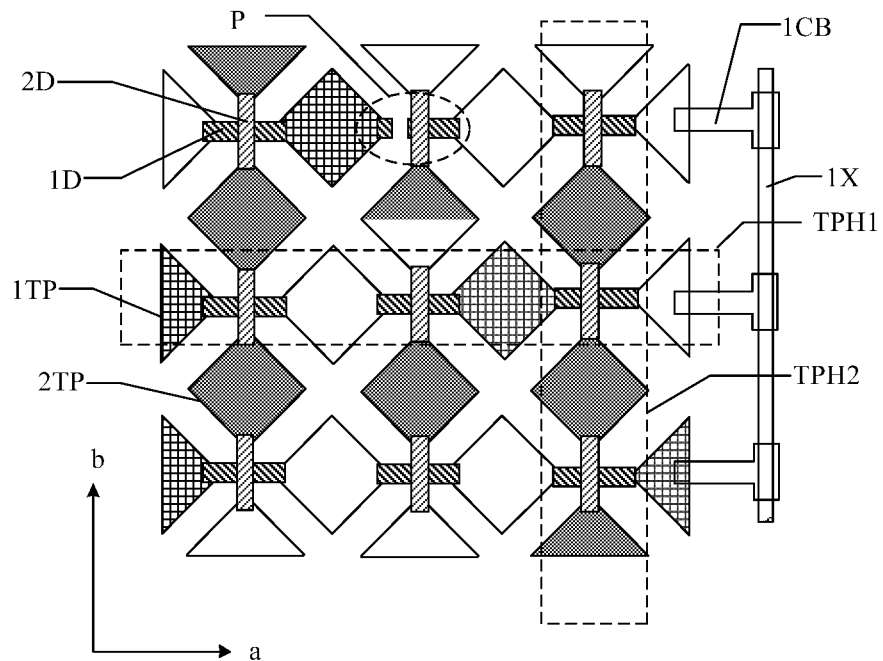
FIG. 12 illustrates another schematic diagram of an exemplary touch panel consistent with various disclosed embodiments of the present disclosure.

In one embodiment, one repair line connects a plurality of repair conductive portions, or one repair line overlaps a plurality of repair conductive portions. The extension direction of the repair line intersects with the extending direction of the touch electrode line for repair (optionally, perpendicular to each other). Each of the repair conductive portions overlapping or electrically connected to a same repair line respectively corresponds to different touch electrode lines. Taking the touch panel with the first repair conductive portions and the first repair lines as an example, FIG. 12 illustrates another schematic diagram of an exemplary touch panel consistent with various disclosed embodiments of the present disclosure. One first repair line 1X is disposed at the edge of one side of the touch electrode array. One first repairing line 1X corresponds to a plurality of first repairing lines 1CB, and one first repairing line 1CB corresponds to one first touch electrode in a first touch electrode line TPH1. In one embodiment, the first repair lines 1X overlap the first repair lines 1CB, and/or the first repair lines 1CB overlap first touched electrodes 1TP. In fabricating the touch panel, when the plurality of first bridging lines 1D in the first touch electrode line TPH1 are detected to be broken, for example, a first bridging line 1D is broken at the P position as illustrated in FIG. 12, the plurality of first touch electrodes 1TP on the left and right sides of the position are disconnected. Usually touch signal lines are disposed on the touch panel. One touch signal line is connected to one touch electrode line. When the disconnection problem occurs at the P position as shown in FIG. 12, the plurality of first touch electrodes 1TP on the left side of the P position can still provide voltage signals through touch signal lines (not shown). The plurality of first touch electrodes 1TP on the right side of the P position have no voltage signal provided, thereby affecting the touch function of the first touch electrode line TPH1 where the disconnection position is located. Applying the design of the touch panel provided by the present disclosure, when the disconnection problem occurs at the P position, first repair conductive portions 1CB corresponding to the touch electrode line and the first touch electrode 1TP may be overlapped and connected by a fusion bonding process. And/or, first repair conductive portions 1CB corresponding to the row are electrically connected to the first repair lines 1X. First touch units can be used to provide voltage signals to the plurality of first touch electrodes 1TP on the right side of the P position, thereby realizing the repair of first touch electrode line TPH1. In the design, one repair line corresponds to the plurality of repair conductive portions. One repair conductive portion corresponds to one touch electrode line. A plurality of touch electrode lines can be repaired. All the touch electrode lines disposed in a same direction can be repaired by a repair line, which improves the uniformity of repair and ensures that all touch electrode lines disposed in the same direction can be repaired. The embodiment can realize the repair of touch electrode lines at any positions in the touch electrode array and has wide applicability.

In one embodiment, it can be set that one repair conductive portion corresponds to one touch electrode line and one repair conductive portion corresponds to one repair line. That is, the repair of one entire touch electrode line can be realized by the repair conductive portion and the repair lines overlapping or electrically connected to the repair conductive portion. It is not necessary to set each touch electrode in one touch electrode line to correspond to one repair conductive portion. The embodiment is simpler in design.

Figure 13:
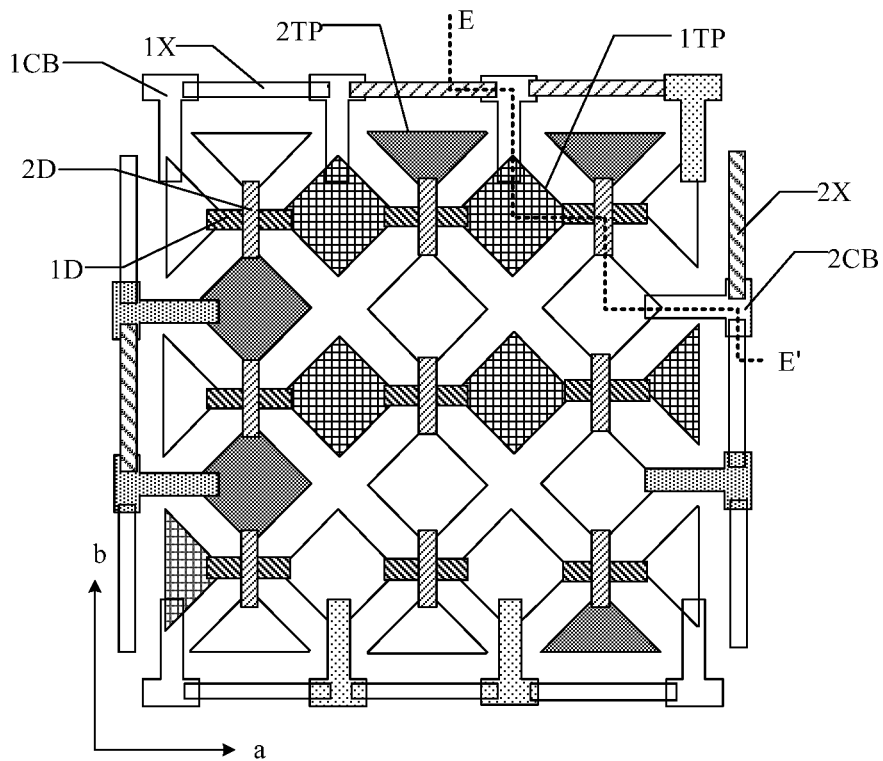
FIG. 13 illustrates yet another schematic diagram of an exemplary touch panel consistent with various disclosed embodiments of the present disclosure.

FIG. 13 illustrates yet another schematic diagram of an exemplary touch panel consistent with various disclosed embodiments of the present disclosure. The repair lines X further include the second repair lines 2X. Optionally, the second repair lines 2X extend along the second direction b. Repair conductive portions CB further include second repair conductive portions 2CB. FIG. 13 illustrates the positional relationship between the plurality of touch electrodes, the repair lines X, and the repair conductive portions CB only when viewed in a top view. In a direction perpendicular to the touch panel, the plurality of second touch electrodes 2TP in the first and last second touch units TPH2 overlap second repair conductive portions 2CB, and/or, second repair conductive portions 2CB partially overlaps the second repair lines 2X along a first direction a. For the positions of second touch electrodes 2TP, second repair lines 2X and second repair conductive portions 2CB on the film layer, reference may be made FIGS. 4-6. The plurality of second touch electrodes 2TP refer to the position of touch electrodes TP on the film layer. The second repair conductive portions 2CB refers to the position of repair conductive portions CB on the film layer. The second repair lines 2X refer to the position of repair lines X on the film layer. When disconnections occur in the first or last first touch unit, the first repair lines and first repair conductive portions disposed on the touch panel realize the repair of the touch electrode array. The touch panel is further provided with the second repair lines and the second repair conductive portion. When second bridge lines in the first or last second touch unit in the first direction are detected to be broken, the plurality of second touch electrodes and second repair conductive portions, and/or second repair conductive portions and the second repair lines can be overlapped and electrically connected by a fusion bonding process (for example, the fusion location is selected according to the positional relationship between the plurality of second touch electrodes, second repair conductive portions and the second repair lines on the film layer), thereby reconnecting two disconnected second touch electrodes by a second repair conductive portion and a second repair line, realizing the repair of the touch electrode array, ensuring touch performance of the touch panel, and improving product yield. When a fusion bonding process is used for repairing, only local sites instead of the entire touch panel need to be heated and fusion bonded. The fusion bonding process has no effect on light-emitting devices on the touch panel. In a touch panel in which the touch electrode array can be repaired only by fusion bonding the overlapped first repair conductive portions and first repair lines, on the touch panel repair sites are in the non-display area. The positions where fusion sites are located are not provided with light-emitting devices. The fusion bonding process does not need to consider the limitation of the process temperature. The material for the repair lines and the repair conductive portions may also be any metal material.

FIG. 13 illustrates the condition in which the second repair lines 2X are disposed at positions adjacent to the first second touch unit TPH2 and the last second touch unit TPH2 in the second direction a. In some optional embodiments, the second repair lines 2X may also be disposed only at the positions adjacent to the first or last second touch unit TPH2.

Figure 14:
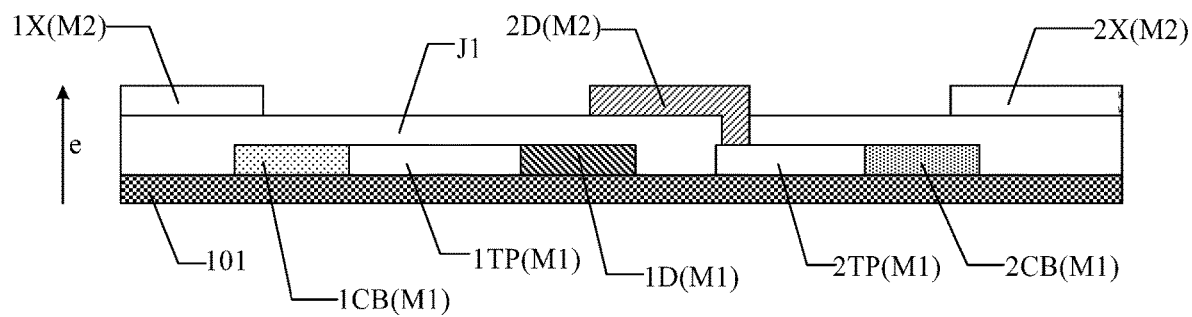
FIG. 14 illustrates an E-E' sectional view of the exemplary touch panel in FIG. 13 consistent with various disclosed embodiments of the present disclosure.

FIG. 14 illustrates an E-E' sectional view of the exemplary touch panel in FIG. 13 consistent with various disclosed embodiments of the present disclosure. The touch panel includes a first conductive layer M1, a first insulation layer J1, and a second conductive layer M2 disposed in sequence. The first touch electrode 1TP and the second touch electrode 2TP are on the first conductive layer M1. The plurality of first bridging lines 1D are on the first conductive layer M1. The plurality of second bridging lines 2D are on the second conductive layer M2 (the plurality of first bridging lines may be on the second conductive layer, and the plurality of second bridging lines may be on the first conductive layer). The first repair conductive portions 1CB and the second repair conductive portions 2CB are on the first conductive layer M1. The first repair lines 1X and the second repair lines 2X are on the second conductive layer M2. First repair conductive portions 1CB are in direct contact with the plurality of first touch electrodes 1TP. Second repair conductive portions 2CB are in direct contact with the plurality of second touch electrodes 2TP. In the direction e perpendicular to the touch panel, first repair conductive portions 1CB partially overlap the first repair lines 1X, and the second repair conductive portions 2CB partially overlap the second repair lines 2X.

The touch panel provided by the embodiment can realize the repair of the touch electrode array when disconnections occur in the first or last touch unit. When disconnections occur in the first or last second touch unit, the repair of the touch electrode array can be realized, thereby improving the touch panel product yield. First repair conductive portions and second repair conductive portions are on the first conductive layer. The first repair lines and the second repair lines are on the second conductive layer. The design of first repair conductive portions and the first repair lines does not increase film structures of the touch panel, which helps reduce the thickness of the touch panel. The first repair conductive portions, the second repair conductive portions and the plurality of touch electrodes can be formed in a same formation process. The first repair lines, the second repair lines and the plurality of first bridging lines or second bridging lines can be formed in the same formation process. The formation process is reused without adding new formation processes, therefore the formation process is relatively simple. In repairing the touch electrode array, only areas where the first repair lines overlap the first repair conductive portions, or areas where the second repair lines overlap second repair conductive portions are only needed to be used as fusion sites. Fusion sites are in the non-display area, and the fusion process has no effect on the degradation of light-emitting devices.

Figure 15:
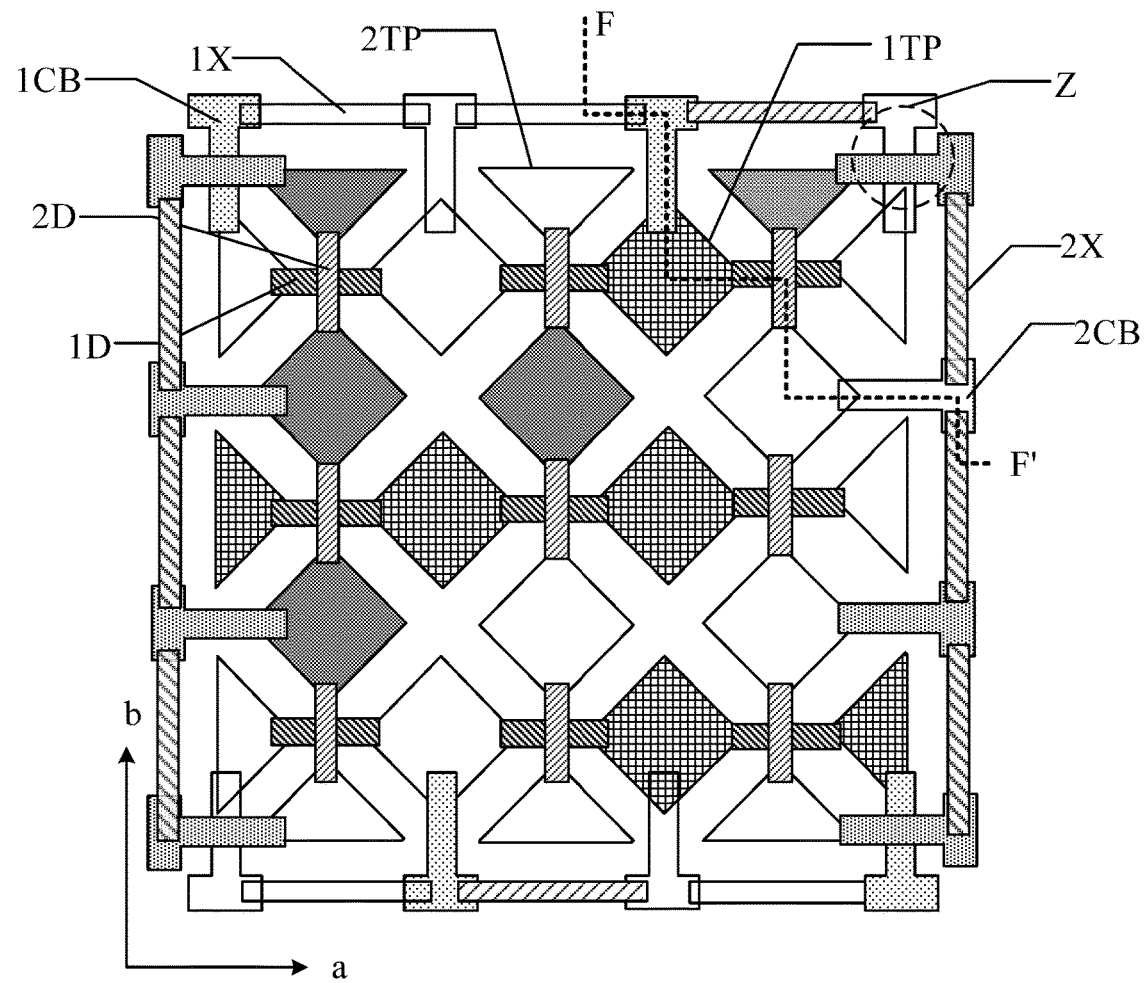
FIG. 15 illustrates still another schematic diagram of an exemplary touch panel consistent with various disclosed embodiments of the present disclosure.
Figure 16:
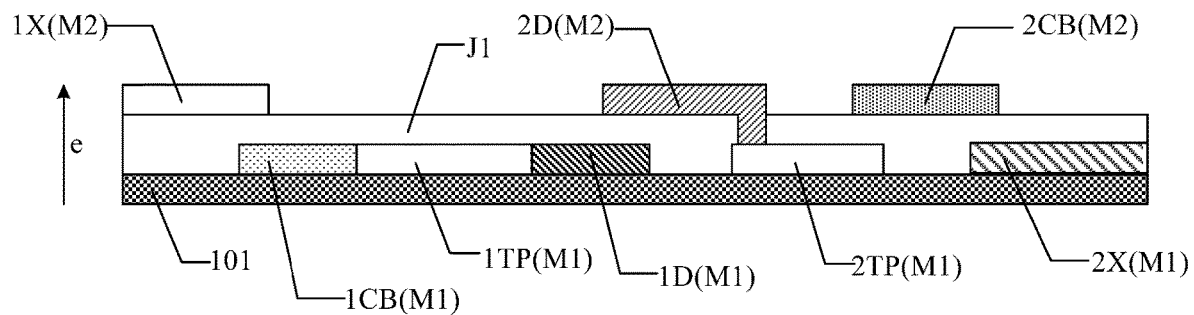
FIG. 16 illustrates an F-F' sectional view of the exemplary touch panel in FIG. 15 consistent with various disclosed embodiments of the present disclosure.

FIG. 15 illustrates still another schematic diagram of an exemplary touch panel consistent with various disclosed embodiments of the present disclosure. FIG. 16 illustrates an F-F' sectional view of the exemplary touch panel in FIG. 15 consistent with various disclosed embodiments of the present disclosure.

In one embodiment shown in FIG. 15, compared with the embodiment corresponding to FIG. 13, first repair conductive portions 1CB and second repair conductive portions 2CB are simultaneously disposed at the corner position Z of the touch electrode array. There are overlaps between first repair conductive portions 1CB and second repair conductive portions 2CB at the corner position Z. In FIG. 16, the touch panel includes a first conductive layer M1, a first insulation layer J1, and a second conductive layer M2 disposed in sequence. The plurality of first touch electrodes 1TP and the plurality of second touch electrodes 2TP are on the first conductive layer M1. The plurality of first bridging lines 1D are on the first conductive layer M1. The plurality of second bridging lines 2D are on the second conductive layer M2. In another embodiment, first bridge lines are on the second conductive layer, and second bridge line are on the first conductive layer. First repair conductive portions 1CB are on the first conductive layer M1. The first repair lines 1X are on the second conductive layer M2. Second repair conductive portions 2CB are on the second conductive layer M2. The second repair lines 2X are on the first conductive layer M1.

In one embodiment, the first repair conductive portions and the second repair conductive portions are disposed on different film layers to ensure that first repair conductive portions and second repair conductive portions are insulated from each other at a corner position of the touch electrode array. When the plurality of first bridging lines or second bridging lines at the corner position of the touch electrode array are broken, the corner position can also be repaired to improve the touch panel product yield. In addition, first repair conductive portions and second repair conductive portions are disposed on different layers. The first repair lines and the second repair lines are disposed on different layers. The first repair conductive portions, the second repair conductive portions, the first repair lines and the second repair lines are respectively in the original film layer structures of the touch electrode array. The touch panel does not need to add new film layer structures, which helps reduce the thickness of the touch panel. The original process can be reused in fabricating the touch panel, making the fabrication process relatively simple.

In one embodiment different from the drawing corresponding to FIG. 16, in a direction perpendicular to the touch panel, second repair conductive portions 2CB overlap and connect to the plurality of second touch electrodes 2TP. That is, second repair conductive portions 2CB and second touch electrode 2TP are connected by through holes on the first insulation layer J1. In the formation process, through holes connecting second repair conductive portions 2CB and second touch electrode 2TP, and through holes connecting the plurality of second bridging lines and the plurality of second touch electrodes can be formed in a same process. When the second touch electrode line is detected to be repaired, it is only necessary to connect the overlapped second repair conductive portions and second repair lines at positions that need to be repaired. Two adjacent second touch electrodes can be connected by a second repair conductive portion and a second repair line. Fusion sites are in the non-display area. The fusion process has no effect on the degradation of light-emitting devices.

In some optional embodiments, references may be made to FIG. 13 and FIG. 15. A plurality of the repair lines X are disposed around the touch electrode array to form a non-closed pattern. The repair lines are disposed outside edges of the touch electrode array. The plurality of the repair lines may form a non-closed pattern. That is, at least the repair lines extending along different directions (the first repair lines and the second repair lines) are insulated from each other, to ensure that the first repair lines repair the first touch unit, and the second repair lines repair the second touch unit. The first touch unit and the second touch unit are still insulated after the repair process, thereby ensuring the reliability of the touch performance.

Figure 17:
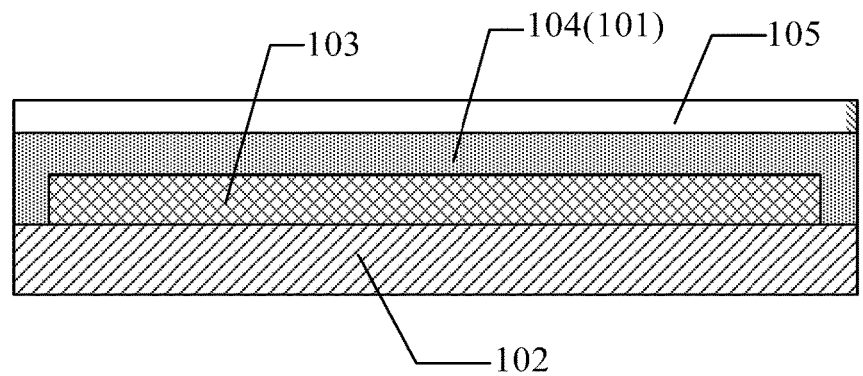
FIG. 17 illustrates a schematic diagram of film structures of a touch panel consistent with various disclosed embodiments in the present disclosure.

FIG. 17 illustrates a schematic diagram of film structures of a touch panel consistent with various disclosed embodiments in the present disclosure. The touch panel further includes: a substrate layer 102; and a display layer 103 on the substrate layer 102. The display layer 103 includes light-emitting devices. Light-emitting devices may be organic light-emitting devices. The encapsulation layer 104 is on the side of the display layer 103 away from the substrate layer 102. The encapsulation layer 104 surrounds and covers the display layer 103. The encapsulation layer 104 can be a thin film encapsulation structure, which can block water oxygen and ensure the service life of light-emitting devices on the display layer 103. The thin film encapsulation structure includes the at least one organic layer and the at least one inorganic layer. When the thin film encapsulation structure includes a plurality of film layers, organic layers and inorganic layers are alternately disposed. The encapsulation layer 104 is the substrate 101 described above. The touch electrode layer 105 is on the side of the encapsulation layer 104 away from the display layer 103. On the touch panel, the touch electrode layer is above the display layer and the encapsulation layer. In forming the touch electrode layer by an etching process, in order to avoid affecting the performance of light-emitting devices on the display layer, in the photoresist curing process after the spin-on photoresist, the curing temperature cannot be too high, so that the thickness of the photoresist in the edge region around the cured photoresist is smaller than the thickness of the photoresist in the center region (see the illustration in FIG. 1), the plurality of bridging lines formed in the edge position of the touch electrode array on the touch electrode layer are thinner, and the risk of disconnection is larger. The repair lines are disposed outside the touch electrode array by setting the repair lines and the repair conductive portions on the touch panel. In a direction perpendicular to the touch panel, at least part of touch electrodes at edges of the touch electrode array overlap the repair conductive portions, and/or the repair conductive portions overlap at least part of repair lines. When the plurality of bridging lines are detected to be broken at edges of the touch electrode array, the overlapped touch electrodes and repair conductive portions, and/or the overlapped repair lines and repair conductive portions can be connected by a fusion bonding process, thereby realizing the connection between two touch electrodes connected by a bridging lines through a repair conductive portion and a repair line, realizing the repair of the touch electrode array, ensuring the reliability of the touch performance of the touch panel, and improving the product yield.

Figure 18:
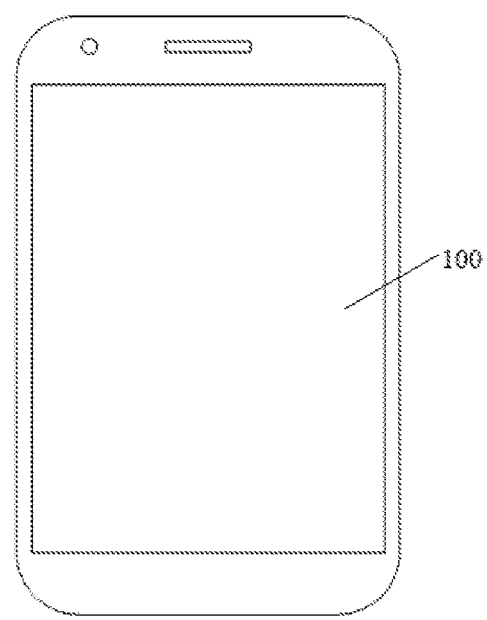
FIG. 18 illustrates a schematic diagram of a touch device consistent with various disclosed embodiments in the present disclosure.

According to various embodiments, the present disclosure also provides a touch device. FIG. 18 illustrates a schematic diagram of a touch device consistent with various disclosed embodiments in the present disclosure. The touch device includes the touch panel 100 provided by any embodiment of the present disclosure. The touch device can be any electronic product with touch functions, including but not limited to the following categories: television, notebook computer, desktop display, tablet computer, digital camera, mobile phone, smart bracelet, smart glasses, car display, medical equipment, industrial equipment, touch interactive terminals and the like.

Figure 19:
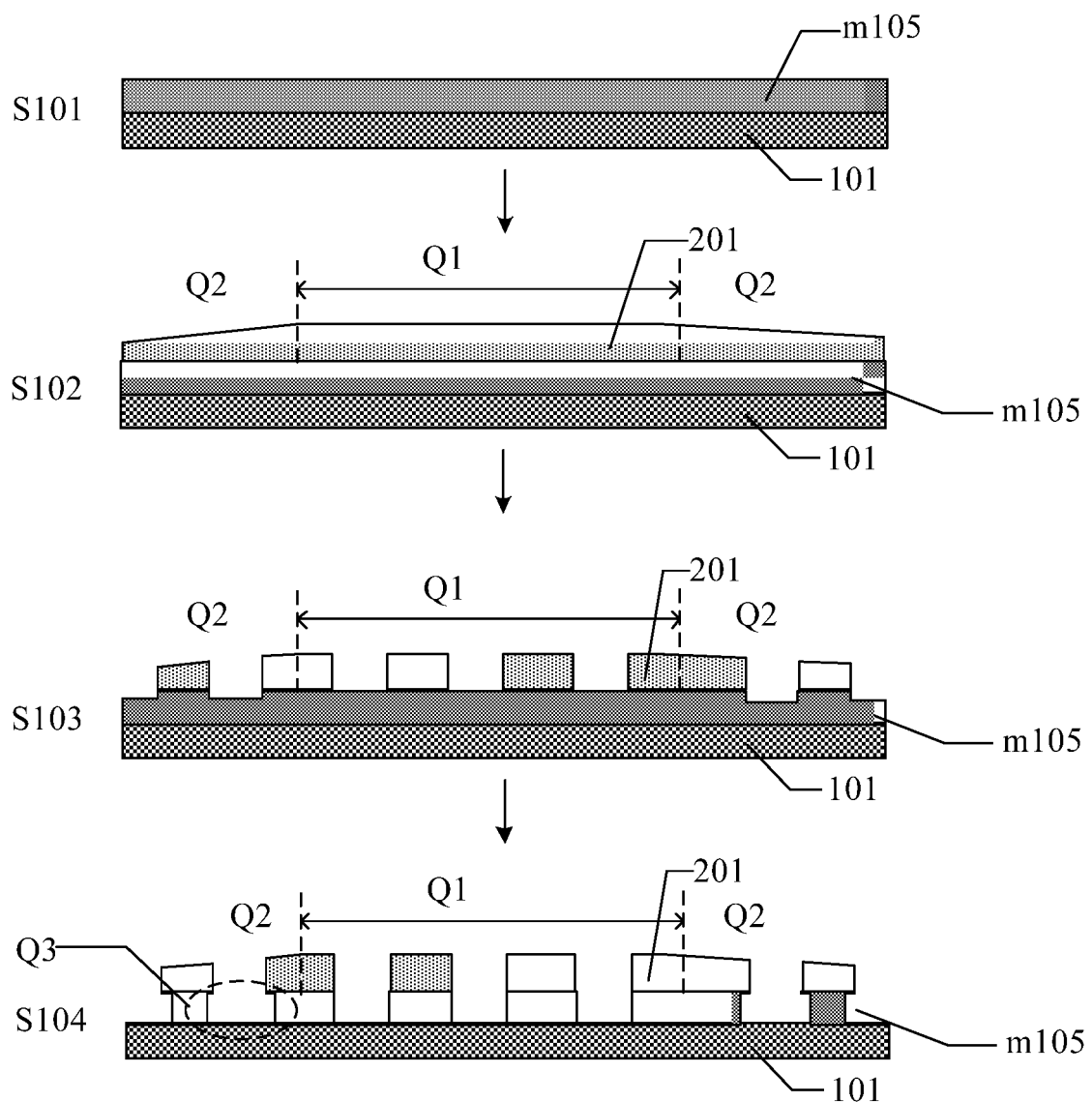
FIG. 19 illustrates a schematic diagram of forming a touch electrode layer in fabricating a touch panel consistent with various disclosed embodiments in the present disclosure.

According to various embodiments, the present disclosure further provides a method for fabricating a touch panel. The fabricating method includes forming a touch electrode layer, the repair lines, and the repair conductive portions on the substrate. The touch electrode layer includes a touch electrode array. The repair lines are outside the touch electrode array. In a direction perpendicular to the touch panel, at least part of touch electrodes at edges of the touch electrode array overlap the repair conductive portions, and/or the repair conductive portions overlap at least part of repair lines. The top view of the touch panel fabricated by the fabrication method provided by the present disclosure and the schematic diagram of the film layer can be referred to the corresponding embodiments of the touch panel described above. FIG. 19 illustrates a schematic diagram of forming a touch electrode layer in fabricating a touch panel consistent with various disclosed embodiments in the present disclosure. The formation process of the touch electrode layer includes Step S101: forming a touch electrode film layer m105 on the substrate 101.

Step S102: coating the photoresist 201 on the touch electrode film layer m105, and curing the coated photoresist 201. In the process of fabricating the touch panel, to avoid the effect of the curing temperature of the photoresist on light-emitting devices, it is necessary to ensure that the photoresist is cured at a lower temperature, which also causes the edge of the photoresist is incompletely cured, and the thickness of photoresist 201 in the central region Q1 is greater than the thickness of the photoresist in the edge region Q2.

Step S103: exposing the cured photoresist 201, and removing a portion of the photoresist to expose the touch electrode film layer m105. Since the photoresist at the position of the edge region Q2 is thinner, the photoresist in the edge region Q2 is dissolved earlier than that in the central region Q1 and exposes the touch electrode film layer m105 under the photoresist. The touch electrode film layer m105 corresponding to the edge region Q2 is also affected by the developer to become thin.

Step S104: etching the touch electrode film layer m105 to form a touch electrode array. Since the touch electrode film layer m105 corresponding to the edge region Q2 is thinner, when etched under a same process conditions, the etching degree of the touch electrode film layer m105 corresponding to the edge region Q2 is greater than the etching degree of the touch electrode film layer m105 corresponding to the center region Q1 (the over-etching at region Q3 is shown in FIG. 19). Accordingly, the area of the pattern formed on the touch electrode film layer m105 corresponding to the etched edge region Q2 may become smaller. The formed conductive wires are thin, and there is a risk of disconnection.

The fabricating method of the touch panel provided by the present disclosure further includes forming the repair conductive portions and the repair lines. The repair lines are formed outside the touch electrode array. In a direction perpendicular to the touch panel, at least part of touch electrodes at edges of the touch electrode array overlap the repair conductive portions, and/or the repair conductive portions overlap at least part of repair lines. When the disconnection of the conductive traces at the edge position of the touch electrode array is detected, the overlapped touch electrodes and repair conductive portions, and/or the overlapped repair lines and repair conductive portions can be connected by a fusion bonding process. The connection between the two touch electrodes connected by a bridge line is realized by a repair conductive portion and a repair line, thereby realizing the repair of the touch electrode array, ensuring the reliability of the touch performance of the touch panel, and improving the product yield.

The step of coating the photoresist on the touch electrode film layer and curing the coated photoresist further includes curing the coated photoresist at a temperature of t, and 50° C.≤t≤80° C. The curing temperature of the photoresist is less than or equal to 80° C., to ensures that the photoresist curing process does not degrade light-emitting devices on the touch panel. The photoresist curing temperature is greater than or equal to 50° C. to ensure that the photoresist can be cured in the temperature environment, so that the curing time is not too long to affect the production efficiency.

In one embodiment, the substrate is an encapsulation layer; the formation method further includes: providing a substrate layer; forming a display layer on the substrate layer; and forming an encapsulation layer on the display layer. The touch panel fabricated in one embodiment can refer to the embodiment corresponding to FIG. 17.

According to various embodiments, the present disclosure further provides a repair method for a touch panel, which can be used for repairing the touch panels provided by any of the disclosed embodiments. When it is detected that part of the touch panel needs to be repaired, the repair method includes at least electrically connecting the repair conductive portions with an overlapped portion between the repair conductive portions and the at least part of repair lines. In some optional embodiments, the repair method further includes electrically connecting the repair conductive portions to the overlapped touch electrodes. Optionally, the method of electrically connecting the repair conductive portions with the overlapped portion between the repair conductive portions and the at least part of repair lines includes performing a fusion bonding process between the repair conductive portions and the overlapped portion. The fusion bonding process can be the laser welding.

Figure 20:
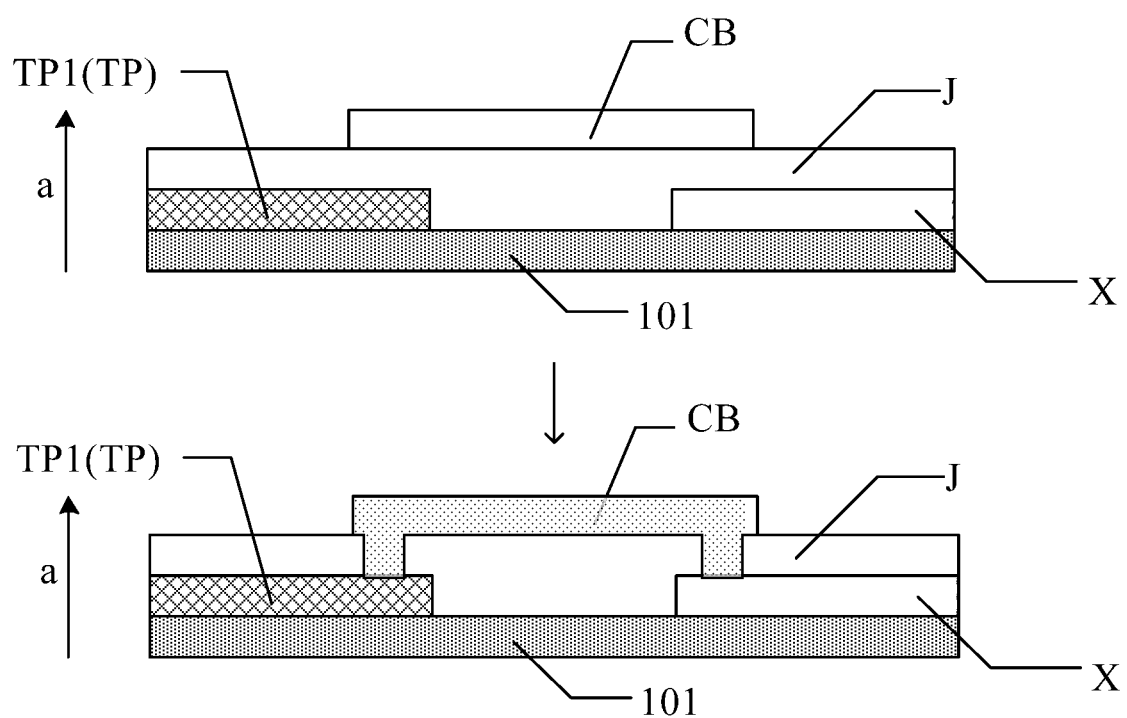
FIG. 20 illustrates a schematic diagram of repairing a touch panel by using the repair method provided by the present disclosure.

Assuming that a plurality of bridging lines between a plurality of touch electrodes TP1 and a plurality of touch electrodes TP2 are broken on the touch panel illustrated in FIG. 3, the touch electrode array needs to be repaired. The positions of touch electrodes, repair conductive portions and repair lines on the film layer illustrated in FIG. 4 are taken as an example. FIG. 20 illustrates a schematic diagram of repairing a touch panel by using the repair method provided by the present disclosure. As shown in FIG. 20, after repair, in the direction perpendicular to the touch panel, the repair conductive portions are electrically connected with the overlapped portion between the repair conductive portions and the at least part of repair lines. The repair conductive portions are electrically connected to the overlapped portion of the touch electrodes with the repair conductive portions, thereby electrically connecting the plurality of touch electrodes TP1 and the plurality of touch electrodes TP2 by the repair conductive portions and the repair lines, and realizing the repair of the touch electrode array.

In some optional embodiments, the repair conductive portions at repair positions on the touch panel are connected to the plurality of touch electrodes. Only the overlapped positions of repair conductive portions and repair lines need to be repaired as the repair sites.

Further, on the touch panel illustrated in FIG. 7, in the second direction, when a plurality of first bridging lines in the first and/or the last first touch unit break, the repair method provided by the present disclosure includes: electrically connecting two first touch electrodes, corresponding to a first bridging line that is broken, and that are electrically connected by the first bridging line before the first bridging line is broken, through a first repair line. The electrically connecting of the two first touch electrodes at least includes electrically connecting the first repair conductive portions with an overlapped portion between the first repair conductive portions and at least part of the first repair lines. Accordingly, the two first touch electrodes are reconnected by a first repair conductive portion and a first repair line, thereby realizing the repair of the touch electrode array, ensuring the touch performance of the touch panel and improving the product yield. In addition, when the repair process is performed by a fusion bonding process, only local sites instead of the entire touch panel need to be heated and fusion bonded. The fusion bonding process has no effect on light-emitting devices on the touch panel. In particular, in a touch panel in which the touch electrode array can be repaired only by fusion bonding the overlapped first repair conductive portions and first repair lines, repair sites are in the non-display area. Light-emitting devices are not disposed at positions where fusion sites are located, the fusion bonding process does not need to consider the limitation of the process temperature, and the material for the repair lines and the repair conductive portions may also be any metal material.

Further, as illustrated in FIG. 13, along the first direction, when a plurality of second bridging lines in the first and/or the last second touch unit break, the repair method provided by the present disclosure includes: electrically connecting two second touch electrodes, corresponding to a second bridging line that is broken, and that are electrically connected by the second bridging line before the second bridging line is broken, through a second repair line. The electrically connecting of the two second touch electrodes at least includes electrically connecting the second repair conductive portions with an overlapped portion between the first repair conductive portions and at least part of the second repair lines.

The method realizes the reconnection of two second touch electrodes by a second repair conductive portion and a second repair line, thereby realizing the repair of the touch electrode array, and ensuring the touch performance of the touch panel and improving the product yield. In addition, when a fusion bonding process is used for repairing, only local sites instead of the entire touch panel need to be heated and fusion bonded. The fusion bonding process has no effect on light-emitting devices on the touch panel. In particular, in a touch panel in which the touch electrode array can be repaired only by fusion bonding the overlapped first repair conductive portion and first repair lines, repair sites are in the non-display area. Light-emitting devices are not disposed at positions where fusion sites are located, the fusion bonding process does not need to consider the limitation of the process temperature, and the material for the repair lines and the repair conductive portions may also be any metal material.

The touch panel, the fabricating method thereof, the repair method, and the touch device provided by the present disclosure can achieve at least the following beneficial effects.

The touch panel provided by the present disclosure has the repair lines and a repair conductive portion. The repair lines are outside the touch electrode array. In a direction perpendicular to the touch panel, at least part of touch electrodes at edges of the touch electrode array overlap the repair conductive portions, and/or the repair conductive portions overlap at least part of repair lines. When the disconnection of bridging lines is detected at the edge position of the touch electrode array, the overlapped touch electrodes and repair conductive portions and/or the overlapped repair lines and repair conductive portions can be connected by a fusion bonding process, so that the connection between two touch electrodes connected by a bridging line is realized by a repair conductive portion and a repair line, thereby realizing the repair of the touch electrode array, ensuring the reliability of touch performance of the touch panel, and improving the product yield.

Embodiments of the present disclosure are exemplary only. Those skilled in the art should understand that the above examples are for illustrative purposes only and are not intended to limit the scope of the present disclosure. The above embodiments may be modified without departing from the scope and spirit of the disclosure. The scope of the disclosure is defined by the appended claims.

What is claimed is:

1. A touch panel, comprising:
a substrate;
a touch electrode layer, repair lines, and repair conductive portions, on the substrate, wherein:
the touch electrode layer comprises a touch electrode array, and the repair lines are outside the touch electrode array;
in a direction perpendicular to the touch panel, at least part of touch electrodes at edges of the touch electrode array overlaps the repair conductive portions;
an edge of a repair conductive portion of the repair conductive portions is in contact with an edge of a repair line of the repair lines, on a same layer;
the touch electrode array comprises a plurality of first touch units extending in a first direction and a plurality of second touch units extending in a second direction, the plurality of first touch units are disposed in sequence in the second direction, the plurality of second touch units are disposed in sequence in the first direction;
the first touch unit comprises a plurality of first touch electrodes and a plurality of first bridging lines, the first bridging line is electrically connected to two adjacent first touch electrodes, the second touch unit comprises a plurality of second touch electrodes and a plurality of second bridging lines, the second bridging line is electrically connected to two adjacent second touch electrodes, the plurality of first bridging lines are insulated from and cross the plurality of second bridging lines; and
the repair lines comprise first repair lines, the repair conductive portions comprise first repair conductive portions, in a direction perpendicular to the touch panel, the first touch electrode in the first and/or last one of the first touch units along the second direction overlaps the first repair conductive portions, and/or the first repair conductive portions partially overlap the first repair lines,
a first conductive layer, a first insulation layer, and a second conductive layer disposed in sequence;
the plurality of first touch electrodes and the plurality of second touch electrodes in the first conductive layer, and one of the plurality of first bridging lines or the plurality of second bridging lines on the first conductive layer, and the other of the plurality of first bridging lines or the plurality of second bridging lines on the second conductive layer; and the first repair conductive portions on the first conductive layer, and the first repair lines on the second conductive layer.

2. The touch panel according to claim 1, wherein:
the repair lines further comprise second repair lines, the repair conductive portions further comprise second repair conductive portions, in a direction perpendicular to the touch panel, along the first direction, the first touch electrode in the first and/or last one of the second touch units overlaps the second repair conductive portion, and/or the second repair conductive portions partially overlap the second repair lines.

3. The touch panel according to claim 2, further comprises:
the second repair conductive portions on the second conductive layer, and the second repair lines on the first conductive layer.

4. The touch panel according to claim 2, wherein:
the repair lines are disposed around the touch electrode array to form a non-closed pattern.

5. The touch panel according to claim 1, wherein:
the plurality of first touch electrodes and the plurality of second touch electrodes are on a same film layer.

6. The touch panel according to claim 1, further comprising:
a substrate layer;
a display layer above the substrate layer; and
an encapsulation layer on the side of the display layer away from the substrate layer,
wherein:
the encapsulation layer is the substrate, and the touch electrode layer is on the side of the encapsulation layer away from the display layer.

7. A repair method of a touch panel, comprising:
providing a touch panel including:
a substrate; a touch electrode layer, repair lines, and repair conductive portions, on the substrate, wherein the touch electrode layer comprises a touch electrode array, and the repair lines are outside the touch electrode array; in a direction perpendicular to the touch panel, at least part of touch electrodes at edges of the touch electrode array overlaps the repair conductive portions; an edge of a repair conductive portion of the repair conductive portions is in contact with an edge of a repair line of the repair lines, on a same layer, the touch electrode array comprises a plurality of first touch units extending in a first direction and a plurality of second touch units extending in a second direction, the plurality of first touch units are disposed in sequence in the second direction, the plurality of second touch units are disposed in sequence in the first direction; the first touch unit comprises a plurality of first touch electrodes and a plurality of first bridging lines, the first bridging line is electrically connected to two adjacent first touch electrodes, the second touch unit comprises a plurality of second touch electrodes and a plurality of second bridging lines, the second bridging line is electrically connected to two adjacent second touch electrodes, the plurality of first bridging lines are insulated from and cross the plurality of second bridging lines; and the repair lines comprise first repair lines, the repair conductive portions comprise first repair conductive portions, in a direction perpendicular to the touch panel, the first touch electrode in the first and/or last one of the first touch units along the second direction overlaps the first repair conductive portions, and/or the first repair conductive portions partially overlap the first repair lines; a first conductive layer, a first insulation layer, and a second conductive layer disposed in sequence; the plurality of first touch electrodes and the plurality of second touch electrodes in the first conductive layer, and one of the plurality of first bridging lines or the plurality of second bridging lines on the first conductive layer, and the other of the plurality of first bridging lines or the plurality of second bridging lines on the second conductive layer; and the first repair conductive portions on the first conductive layer, and the first repair lines on the second conductive layer; and when a portion of the touch panel is detected to be repaired, electrically connecting the repair conductive portions with an overlapped portion between the repair conductive portions and the at least part of repair lines.

8. The method according to claim 7, further comprising:
along the second direction, when the first bridging line in the first and/or the last one of the first touch units breaks,
electrically connecting two first touch electrodes, corresponding to a first bridging line that is broken, and that are electrically connected by the first bridging line before the first bridging line is broken, through a first repair line, wherein the electrically connecting of the two first touch electrodes at least includes electrically connecting the first repair conductive portions with an overlapped portion between the first repair conductive portions and at least part of the first repair lines.

9. The method according to claim 7, further comprising:
along the first direction, when the second bridging line in the first and/or the last one of the second touch units breaks,
electrically connecting two second touch electrodes, corresponding to a second bridging line that is broken, and that are electrically connected by the second bridging line before the second bridging line is broken, through a second repair line, wherein the electrically connecting of the two second touch electrodes at least includes electrically connecting the second repair conductive portions with an overlapped portion between the first repair conductive portions and at least part of the second repair lines.

10. A touch panel, comprising:
a substrate;
a touch electrode layer, a plurality of first repair lines, and a plurality of first repair conductive portions, disposed over the substrate, wherein:
the touch electrode layer comprises a touch electrode array,
the plurality of first repair lines extends along a first direction outside the touch electrode array,
the plurality of first repair conductive portions is arranged alternately with the plurality of first repair lines along the first direction, and in a direction perpendicular to the touch panel, each first repair conductive portion overlaps two adjacent first repair lines along the first direction and each first repair conductive portion overlaps a corresponding touch electrode along a second direction,
the touch electrode array comprises a plurality of first touch units extending in a first direction and a plurality of second touch units extending in a second direction, the plurality of first touch units are disposed in sequence in the second direction, the plurality of second touch units are disposed in sequence in the first direction,
the first touch unit comprises a plurality of first touch electrodes and a plurality of first bridging lines, the first bridging line is electrically connected to two adjacent first touch electrodes, the second touch unit comprises a plurality of second touch electrodes and a plurality of second bridging lines, the second bridging line is electrically connected to two adjacent second touch electrodes, the plurality of first bridging lines are insulated from and cross the plurality of second bridging lines, and
the repair lines comprise the first repair lines, the repair conductive portions comprise first repair conductive portions, in a direction perpendicular to the touch panel, the first touch electrode in the first and/or last one of the first touch units along the second direction overlaps the first repair conductive portions, and/or the first repair conductive portions partially overlap the first repair lines,
a first conductive layer, a first insulation layer, and a second conductive layer disposed in sequence;
the plurality of first touch electrodes and the plurality of second touch electrodes in the first conductive layer, and one of the plurality of first bridging lines or the plurality of second bridging lines on the first conductive layer, and the other of the plurality of first bridging lines or the plurality of second bridging lines on the second conductive layer; and
the first repair conductive portions on the first conductive layer, and the first repair lines on the second conductive layer.

11. The touch panel according to claim 10, further comprising:
a plurality of second repair lines and a plurality of second repair conductive portions, wherein:
the plurality of second repair lines extends along the second direction outside the touch electrode array, the plurality of second repair lines being spaced apart from the plurality of first repair lines, and
in the direction perpendicular to the touch panel, the plurality of second repair conductive portions is arranged alternately with the plurality of second repair lines along the second direction, and each second repair conductive portion overlaps two adjacent second repair lines along the second direction and overlaps a corresponding touch electrode along the first direction.

* * * * *